United States Patent
Mikami

(10) Patent No.: US 9,958,612 B2
(45) Date of Patent: May 1, 2018

(54) NODE DEVICE AND METHOD FOR CONTROLLING NODE DEVICE

(71) Applicant: NEC Corporation, Tokyo (JP)

(72) Inventor: Satoshi Mikami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 15/516,204

(22) PCT Filed: Sep. 29, 2015

(86) PCT No.: PCT/JP2015/004944
§ 371 (c)(1),
(2) Date: Mar. 31, 2017

(87) PCT Pub. No.: WO2016/051774
PCT Pub. Date: Apr. 7, 2016

(65) Prior Publication Data
US 2017/0299814 A1    Oct. 19, 2017

(30) Foreign Application Priority Data

Oct. 1, 2014  (JP) .................................. 2014-202891

(51) Int. Cl.
G02B 6/293    (2006.01)
H04J 14/02    (2006.01)

(52) U.S. Cl.
CPC ....... *G02B 6/2932* (2013.01); *G02B 6/29322* (2013.01); *G02B 6/29383* (2013.01);
(Continued)

(58) Field of Classification Search
CPC ............... H04J 14/0204; H04J 14/0205; H04J 14/0206; H04J 14/0209; H04J 14/021;
(Continued)

(56) References Cited

U.S. PATENT DOCUMENTS

2004/0264695 A1    12/2004  Turpin
2009/0220242 A1*   9/2009  Ooi ..................... H04J 14/0208
                                                    398/85
(Continued)

FOREIGN PATENT DOCUMENTS

JP    2011-82751     4/2011
JP    2012-29336     2/2012
(Continued)

OTHER PUBLICATIONS

Decision to Grant Patent, issued by Japanese Patent Office, dated Nov. 7, 2017, for counterpart Japanese Patent Application No. 2016-551539.

(Continued)

*Primary Examiner* — Dalzid Singh
(74) *Attorney, Agent, or Firm* — Finnegan, Henderson, Farabow, Garrett & Dunner, L.L.P.

(57) ABSTRACT

In order to prevent a signal which a terminal station does not require from being intercepted by the terminal station without greatly changing the power of optical signals to be transmitted from a node to the terminal station, a node device is provided with: a first optical unit which outputs a first optical signal received from a first terminal station and addressed to a second terminal station, and a second optical signal received from the first terminal station, addressed to a third terminal station, and having a different wavelength band from the first optical signal; and a second optical unit to which the first and second optical signals outputted from the first optical unit are inputted, and which shifts the frequency of the first optical signal by a predetermined amount to create a fourth optical signal, passes the second optical signal without any change, couples the second and fourth optical signals, and transmits a resultant signal to the third terminal station.

19 Claims, 8 Drawing Sheets

(52) U.S. Cl.
CPC ...... *H04J 14/0204* (2013.01); *H04J 14/0205* (2013.01); *H04J 14/0206* (2013.01); *H04J 14/021* (2013.01); *H04J 14/0209* (2013.01); *H04J 14/0213* (2013.01)

(58) Field of Classification Search
CPC ............... H04J 14/0213; G02B 6/2932; G02B 6/29322; G02B 6/29383
USPC .......................................................... 398/9
See application file for complete search history.

(56) References Cited

U.S. PATENT DOCUMENTS

| | | | |
|---|---|---|---|
| 2012/0114335 A1 | 5/2012 | Marcerou et al. | |
| 2013/0315591 A1* | 11/2013 | Inoue | H04J 14/0209 398/48 |
| 2015/0093116 A1* | 4/2015 | Wang | H04Q 11/0005 398/104 |

FOREIGN PATENT DOCUMENTS

| | | |
|---|---|---|
| JP | 2012-531866 | 12/2012 |
| JP | 2017-509183 | 3/2017 |
| WO | WO 2015/146106 A1 | 10/2015 |
| WO | WO 2015/146107 A1 | 10/2015 |

OTHER PUBLICATIONS

International Search Report and Written Opinion dated Oct. 27, 2015, in corresponding PCT International Application.

\* cited by examiner

NODE DEVICE AND METHOD FOR CONTROLLING NODE DEVICE

CROSS-REFERENCE TO RELATED PATENT APPLICATIONS

This application is a National Stage Entry of International Application No. PCT/JP2015/004944, filed Sep. 29, 2015, which claims priority from Japanese Patent Application No. 2014-202891, filed Oct. 1, 2014. The entire contents of the above-referenced applications are expressly incorporated herein by reference.

TECHNICAL FIELD

The present invention relates to a node device and a method for controlling a node device, and particularly to a node device having a function of branching an optical signal between trunk stations to a branch station and a method for controlling such a node device.

BACKGROUND ART

Nowadays an optical add-drop multiplexing (OADM) system having a function of separating and coupling optical signals in wavelength units and a reconfigurable OADM (ROADM) system are being introduced in submarine communication systems using a submarine cable.

FIG. 6 is a block diagram illustrating a general configuration of a submarine communication system 900 into which an OADM system or ROADM system (hereinafter, referred to as "OADM/ROADM system") is introduced. A node 910 has an OADM/ROADM function.

Sub-bands 1 to 3 indicate wavelength bands of optical signals. A destination of an optical signal to be transmitted from a trunk station 51 whose wavelength band is Sub-band 1 is a trunk station 52. A destination of an optical signal whose wavelength band is Sub-band 2 is a branch station 53. Hereinafter, "an optical signal whose wavelength band is Sub-band 1 (or 2, 3)" will be referred to as "optical signals of Sub-band 1 (or 2, 3)".

A node 910 transmits an optical signal of Sub-band 2 of an optical signal 13 received from the trunk station 51 to the branch station 53. The node 910 branches an optical signal of Sub-band 1 included in the optical signal 13 received from the trunk station 51 into two and transmits them to the trunk station 52 and the branch station 53. Further, the node 910 removes a dummy signal from an optical signal 15 received from the branch station 53. The node 910 then transmits an optical signal 14 obtained by coupling an optical signal of Sub-band 3 received from the branch station 53 and an optical signal of Sub-band 1 received from the trunk station 51 to the trunk station 52. Optical submarine repeaters which are not illustrated are installed at some midpoints of submarine cables between the node 910 and the trunk stations 51 and 52, and the branch station 53.

In FIG. 6, since an optical signal addressed to the branch station 53 is only an optical signal of Sub-band 2, an optical signal of Sub-band 1 addressed to the trunk station 52 need not be transmitted to the branch station 53. However, by transmitting the optical signal of Sub-band 1 also to the branch station 53, it is possible to prevent an input power to an optical submarine repeater installed between the node 910 and the branch station 53 from decreasing significantly compared with the optical signal 13. As a result, it is possible to operate an optical submarine repeater used in a submarine communication system 900 within a predetermined rated range common to the submarine communication system 900 without significantly lowering an input power. For the same reason, the branch station 53 transmits a dummy signal 5 in addition to the optical signal of Sub-band 3.

FIG. 7 is a diagram illustrating wavelength bands of the optical signals 13 to 15 transmitted and received at the node 910. In FIG. 7, the wavelength band of the optical signal 13 is divided into two wavelength bands, the optical signal 1 of Sub-band 1 and the optical signal 2 of Sub-band 2. The wavelength band of the optical signal 14 is divided into two wavelength bands of the optical signal 1 of Sub-band 1 and the optical signal 3 of Sub-band 3. Further, the wavelength band of the optical signal 15 is divided into two wavelength bands of the dummy signal and the optical signal 3 of Sub-band 3. The wavelength band of Sub-band 1 and the wavelength band of the dummy signal coincide. The wavelength band of Sub-band 2 and the wavelength band of Sub-band 3 also coincide. The wavelength band of Sub-band 1 and the wavelength band of Sub-band 2 do not overlap. Each of the optical signals 13 to 15 has a channel capable of transmitting at least one carrier (optical carrier wave). Each of the optical signals of Sub-bands 1 to 3 also has a channel capable of transmitting at least one carrier. Each carrier is wavelength-multiplexed and transmitted as any of optical signals 13 to 15.

The frequency of an optical signal used as a carrier is defined, for example, by ITU-T Recommendation G. 694.1. ITU-T stands for The International Telecommunication Union Telecommunication Standardization Sector. In this Recommendation, a frequency group of carriers used in wavelength division multiplexing (WDM) used in an OADM/ROADM system is defined as a frequency grid. In the frequency grid, frequencies of the carriers are arranged at constant intervals.

FIG. 8 is a diagram illustrating a more detailed configuration of the submarine communication system 900 illustrated in FIG. 6. The submarine communication system 900 includes the trunk stations 51 and 52, the branch station 53 and the node 910. The trunk stations 51 and 52 and the branch station 53 transmit and receive the optical signals 1 to 3 and the dummy signal illustrated in FIG. 7 via the node 910. The node 910 includes couplers 6 and 12, wavelength filters 7 and 8. The trunk stations 51 and 52 and the branch station 53 and the node 910 are connected by a submarine cable including an optical submarine repeater 54. In FIG. 8, the optical signals 1 and 2 transmitted from the trunk station 51 correspond to the optical signal 13 in FIG. 6. Likewise, the optical signals 1 and 3 received at the trunk station 52 correspond to the optical signal 14 of FIG. 6. The optical signal 3 and the dummy signal 5 transmitted from the branch station 53 correspond to the optical signal 15 in FIG. 6.

The trunk station 51 transmits the optical signal 1 of Sub-band 1 and the optical signal 2 of Sub-band 2. In a coupler 6 of the node 910, the optical signals 1 and 2 are branched into two. One of the two-branched optical signals is transmitted to the branch station 53. The other of the optical signals two-branched by the coupler 6 passes through a wavelength filter 7 and a coupler 12, and is transmitted to the trunk station 52. The wavelength filter 7 transmits the optical signal of the wavelength band of Sub-band 1 and blocks the optical signal of the wavelength band of Sub-band 2. The wavelength filter 8 transmits the optical signal 3 and blocks the dummy signal 5.

As described above, in order to operate the optical submarine repeater 54 installed on a transmission path from the node 910 to the branch station 53 within a rated range, the optical signal 1 is also transmitted from the node 910 to the branch station 53 in addition to the optical signal 2. As a result, the branch station 53 receives a target optical signal 2, while also receiving the optical signal 1 to be transmitted to the trunk station 52.

In connection with the present invention, PTL 1 describes a technique for preventing an unneeded optical signal from being received by a terminal device by blocking an unneeded optical signal by a sub-band by using a cutoff filter arranged in a transmission path. PTL 2 describes an OADM device including a wavelength selectable switch (WSS) capable of shifting the center frequency.

CITATION LIST

Patent Literature

[PTL 1] Japanese Unexamined Patent Application Publication No. 2011-082751 (paragraphs [0020]-[0021], FIG. 1)
[PTL 2] Japanese Unexamined Patent Application Publication No. 2012-029336 (paragraph [0196], FIG. 44)

SUMMARY OF INVENTION

Technical Problem

In the submarine communication system 900 illustrated in FIG. 8, in order to operate the optical submarine repeater 54 installed between the node 910 and the branch station 53 within a rated range, the optical signal 1 of Sub-band 1 which is not originally needed is transmitted to the branch station 53. In other words, the branch station 53 can receive the optical signal 1 of Sub-band 1 addressed to the trunk station 52. For this reason, the security of the optical signal of Sub-band 1 in the branch station 53 may be not sufficiently ensured.

PTL 1 describes a configuration in which an optical signal in a wavelength band (an S band or an L band) not needed in a branch station is removed using an optical filter. However, in the configuration described in PTL 1, all the optical signals in the wavelength band, the S band or the L band, are removed by the optical filter, and therefore, the power of an optical signal addressed to the branch station is greatly lowered. As a result, an input power to an optical submarine repeater which amplifies the optical signal addressed to the branch station is lowered, and operating conditions of the optical submarine repeater may be outside the rating. For this reason, the technique described in PTL 1 has a problem that operating conditions of the optical submarine repeater may be outside the rating due to a fluctuation of the input power to the optical submarine repeater. PTL 2 does not describe a method for solving a problem that the security of an optical signal not addressed to the branch station may be not sufficiently ensured.

Purpose of the Invention

An object of the present invention is to provide a node device for preventing a signal not needed at a terminal station from being intercepted at the terminal station without significantly changing the power of an optical signal transmitted from a node to the terminal station, and a method for controlling such a node device.

Solution to Problem

A node device of the present invention comprises: a first optical unit for outputting a first optical signal addressed to a second terminal station that is received from a first terminal station and a second optical signal having a wavelength band different from that of the first optical signal addressed to a third terminal station that is received from the first terminal station; and a second optical unit in which the first and second optical signals outputted from the first optical unit are inputted, the frequency of the first optical signal is shifted by a predetermined amount into a fourth optical signal, the second optical signal is passed unchanged, and the second and fourth optical signals are coupled and transmitted to the third terminal station.

A method for controlling a node device of the present invention is characterized by outputting a first optical signal addressed to a second terminal station that is received from a first terminal station and a second optical signal having a wavelength band different from that of the first optical signal addressed to a third terminal station that is received from the first terminal station, shifting the frequency of the first optical signal by a predetermined amount into a fourth optical signal, and coupling the second and fourth optical signals and transmitting the second and fourth optical signals coupled to the third terminal station.

Advantageous Effects of Invention

A node device and a method for controlling a node device of the present invention can prevent a signal not needed at a terminal station from being intercepted at the terminal station without significantly lowering the power of an optical signal transmitted from a node to the terminal station.

DESCRIPTION OF EMBODIMENTS

Summary of Example Embodiments

In the following example embodiments, in a submarine communication system including terminal stations (a trunk station and a branch station) and nodes, among optical signals transmitted from a node to a terminal station, an optical signal not needed for the terminal station is invalidated at the node. The invalidation of an optical signal is performed by a frequency shifter having a function of shifting the center frequency of a carrier (optical carrier wave) included in the optical signal.

Specifically, the frequency shifter shifts the frequency of a carrier included in an optical signal that is not addressed to the branch station to a frequency other than a frequency that the branch station can receive. Hereinafter, changing an optical signal to a state where a branch station cannot receive a signal is referred to as "invalidating". A branch station cannot demodulate an invalidated optical signal. Further, since invalidation of an optical signal is performed only by frequency shift, the power of an optical signal addressed to a branch station is not lowered. In this way, a trunk signal that is not needed at a branch station is invalidated.

First Example Embodiment

Figure 1:
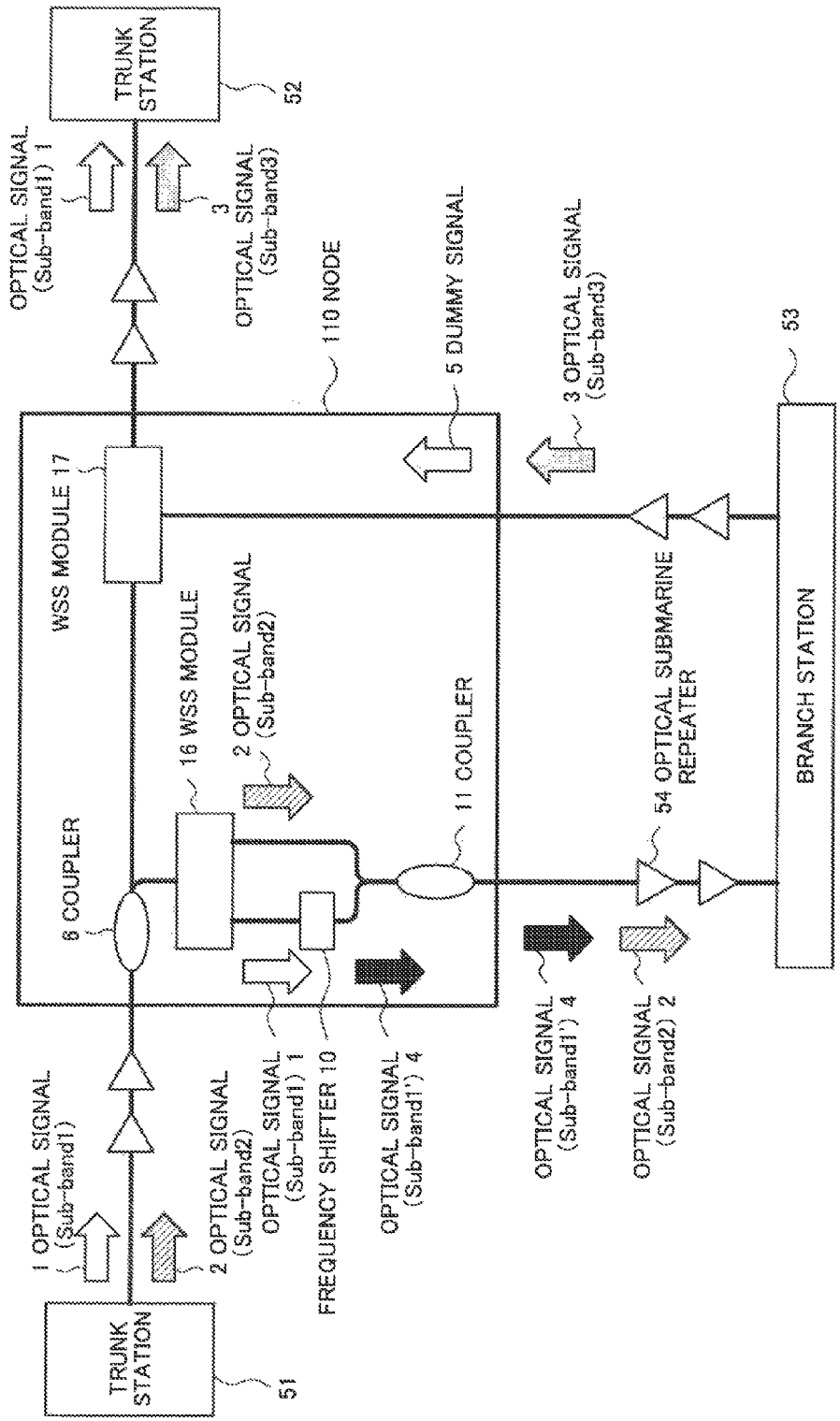
FIG. 1 is a block diagram illustrating a configuration of a submarine communication system according to a first example embodiment of the present invention.

FIG. 1 is a block diagram illustrating a configuration of a submarine communication system 100 according to a first example embodiment of the present invention. The submarine communication system 100 is a submarine cable communication system in which trunk stations 51 and 52 and a branch station 53 are connected to a node 110. The trunk stations 51 and 52 and the branch station 53 and the node 110 are connected by a submarine optical cable. On each submarine optical cable, an optical submarine repeater 54 is installed. The quantity and the installation interval of the optical submarine repeater 54 are determined by installation conditions of the submarine communication system 100.

The node 110 includes a coupler 6, WSS (Wavelength Selectable Switch) modules 16 and 17, a frequency shifter 10, and a coupler (CPL) 11. The coupler 6 is a 1:1 directional coupler. WSS modules 16 and 17 perform predetermined demultiplexing and multiplexing operations on input WDM signals and output the WDM signals. As the coupler 11, a multiplexer capable of wavelength multiplexing an optical signal 4 of Sub-band 1' and an optical signal 2 of Sub-band 2 to be described below is used. Alternatively, as the coupler 11, a directional coupler may be used.

The trunk station 51 wavelength-multiplexes an optical signal 1 of Sub-band 1 and an optical signal 2 of Sub-band 2 and transmits the multiplexed signal to the node 110. The destination of the optical signal 1 is a trunk station 52, and the destination of the optical signal 2 is a branch station 53. The branch station 53 transmits an optical signal 3 of Sub-band 3 and a dummy signal 5 to the node 110. The destination of the optical signal 3 is the trunk station 52. The dummy signal 5 is a signal having no information to be transmitted. Frequency groups (frequency grids) of carriers included in the optical signals 1 to 3 conform to a predetermined standard (for example, ITU-T recommendation G.694.1). Both the trunk stations 51 and 52, the branch station 53 and the node 110 each transmit and receive a light having a frequency grid to which the optical signals 1 to 3 conform.

Figure 2:
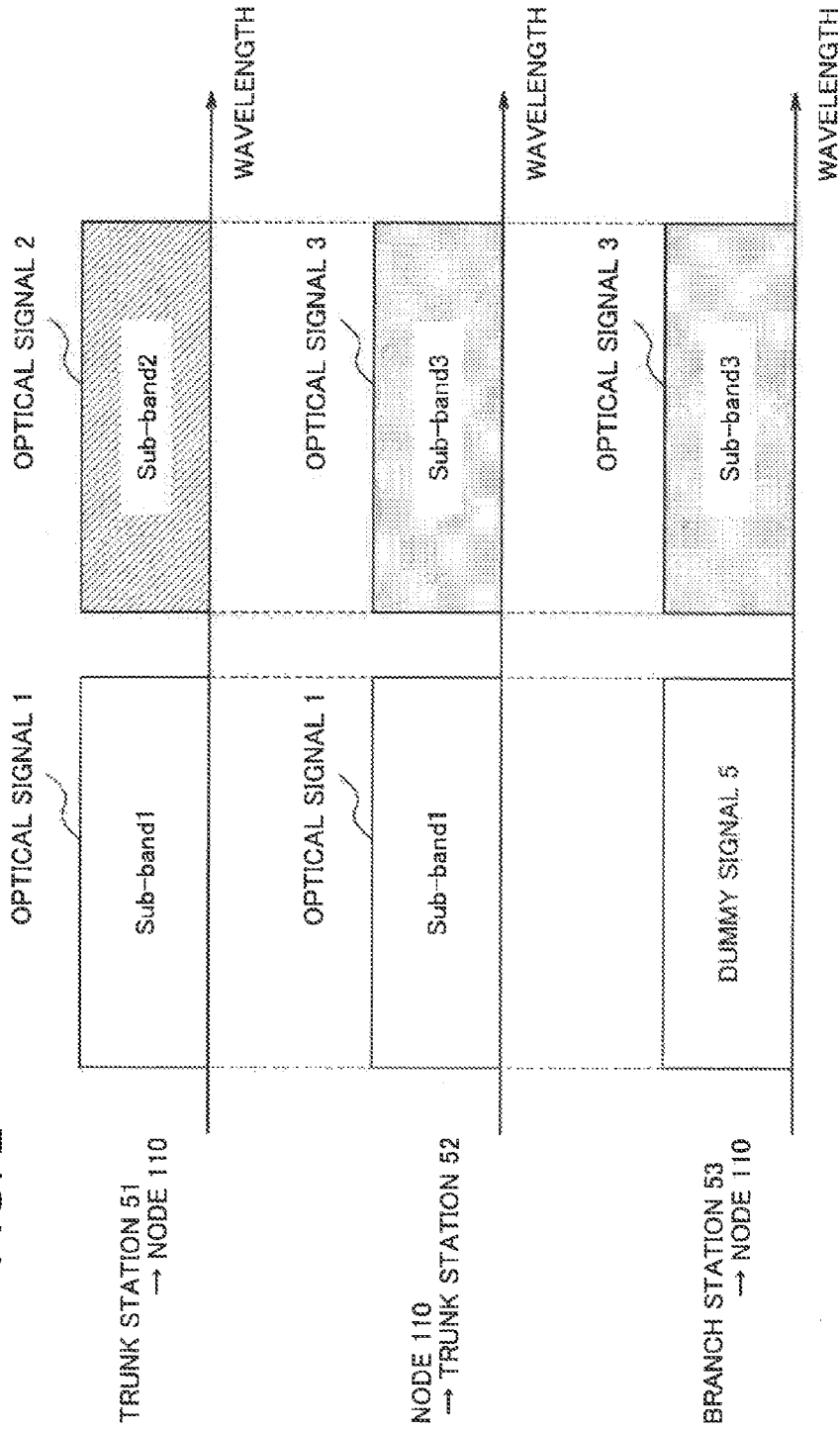
FIG. 2 is a diagram illustrating a relationship between wavelength bands of Sub-bands and a dummy signal.

FIG. 2 illustrates a relationship between wavelength bands of the optical signals 1 to 3 and the dummy signal 5 of Sub-bands 1 to 3. The wavelength bands of Sub-band 1 and the dummy signal 5 are the same, and the wavelength bands of Sub-band 2 and Sub-band 3 are the same. Further, the wavelength band of Sub-band 1 and the wavelength band of Sub-band 2 do not overlap. From the trunk station 51 to the node 110, the optical signal 1 of Sub-band 1 and the optical signal 2 of Sub-band 2 are wavelength multiplexed and the multiplexed signal is transmitted. From the node 110 to the trunk station 52, the optical signal 1 of Sub-band 1 and the optical signal 3 of Sub-band 3 are wavelength multiplexed and the multiplexed signal is transmitted. From the branch station 53 to the node 110, the dummy signal 5 and an optical signal of Sub-band 3 are wavelength multiplexed and the multiplexed signal is transmitted.

As illustrated in FIG. 1, the optical signal 1 and the optical signal 2 transmitted from the trunk station 51 are branched to the trunk station 52 and to the branch station 53 in the coupler 6. The optical signals 1 and 2 branched to the branch station 53 are inputted to the WSS module 16. The WSS module 16 can separate the inputted light into a plurality of wavelength bands and transmit or block light for each of the separated wavelength bands. The WSS module 16 therefore can separate the optical signal 1 and the optical signal 2 and output them from different ports.

Here, the destination of the optical signal 1 is the trunk station 52, and the optical signal 1 is not needed in the branch station 53. For this reason, the optical signal 1 outputted from the WSS module 16 is invalidated by the frequency shifter 10 in such a way that the optical signal 1 cannot be received by the branch station 53.

The optical signal 1 outputted from the WSS module 16 is inputted to the frequency shifter 10. The frequency shifter 10 invalidates the optical signal 1 by shifting the frequency of the optical signal 1 to a frequency that cannot be received by the branch station 53. The invalidated optical signal 1 is outputted from the frequency shifter 10 as the optical signal 4. The optical signal 4 is coupled with the optical signal 2 outputted from the WSS module 16 by the coupler 11 and transmitted to the branch station 53. Details of a process of shifting the frequency of the optical signal 1 in the frequency shifter 10 will be described later.

On the other hand, the optical signals 1 and 2 branched from the coupler 6 to the trunk station 52 are inputted to the WSS module 17. The WSS module 17 blocks the optical signal 2 of Sub-band 2 received from the trunk station 51 and passes the optical signal 1 of Sub-band 1.

The branch station 53 transmits the optical signal 3 of Sub-band 3 and the dummy signal 5 to the trunk station 52. The optical signal 3 is a signal that is transmitted from the branch station 53 and is addressed to the trunk station 52. The wavelength band of the optical signal 3 is the same as that of the optical signal 2. The dummy signal 5 is used to increase the total power of an optical signal traveling from the branch station 53 to the node 110 and operate the optical submarine repeater 54 on the transmission path within a rated range. The dummy signal 5 is an optical signal in the wavelength band of Sub-band 1.

The optical signal 3 and the dummy signal 5 transmitted from the branch station 53 are inputted to the WSS module 17. The WSS module blocks the wavelength band of the dummy signal 5 and wavelength-multiplexes the optical signal 1 received from the trunk station 51 and the optical signal 3 received from the branch station 53, and transmits the wavelength-multiplexed signal to the trunk station 52. Since the wavelength band of the optical signal 1 is Sub-band 1 and the wavelength band of the optical signal 3 is Sub-band 3, the wavelength bands of the optical signal 1 and the optical signal 3 do not overlap. The trunk station 52 receives the optical signal 1 and the optical signal 3 transmitted by the WSS module 17.

Next, the optical signal transmitted from the node 110 to the branch station 53 will be described. The frequency of the carrier included in the optical signal 1 is shifted by the frequency shifter 10 to a frequency different from the carrier frequency included in the frequency grid which can be received by the branch station 53. Such an operation of shifting the frequency of the carrier included in the optical signal 1 to a frequency different from the frequency which can be received by the branch station 53 will be described as "frequency shift" in the following. Due to the frequency shift, the frequency of the carrier included in the optical signal 1 changes, and the optical signal 1 becomes the optical signal 4 which cannot be received at the branch station 53.

Figure 3:
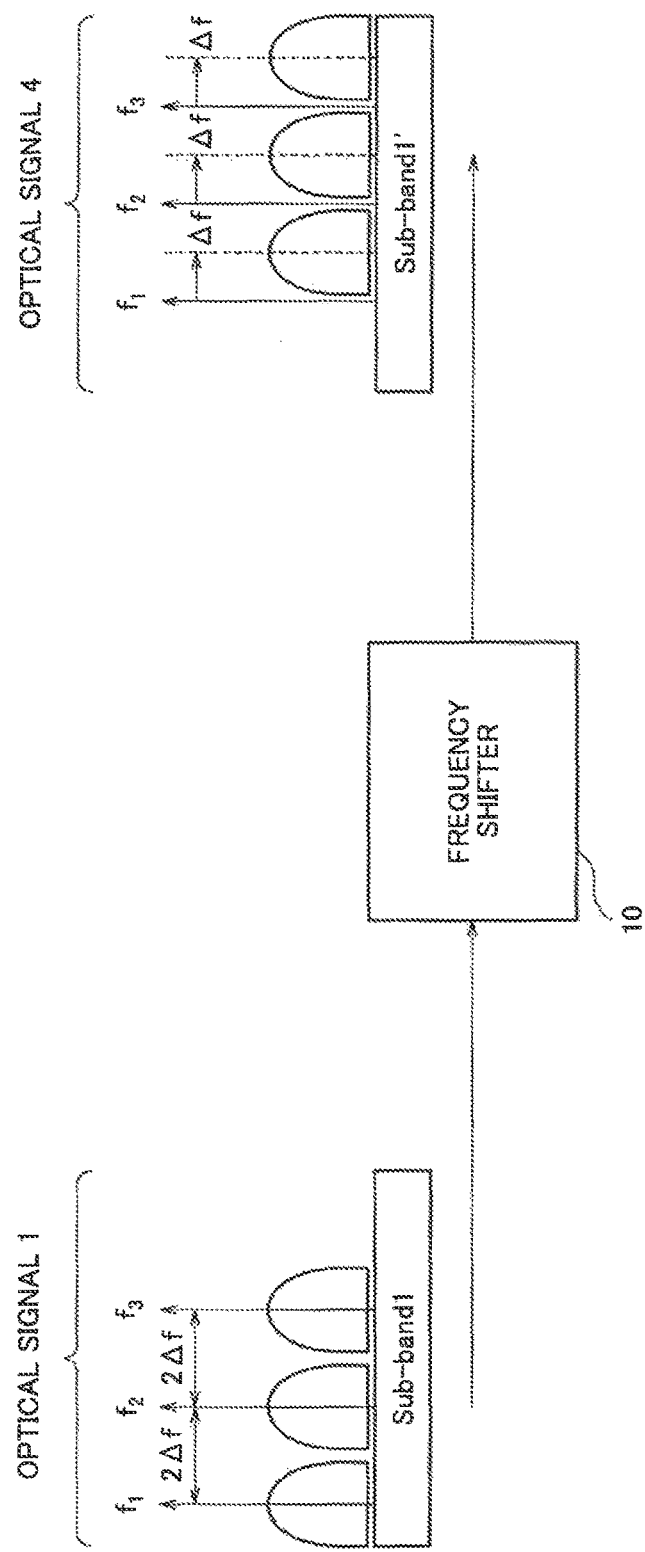
FIG. 3 is a diagram for explaining frequency shift by a frequency shifter.

FIG. 3 is a diagram for explaining frequency shift by the frequency shifter 10. The frequency shifter 10 is a device having a function of shifting the frequency of the input optical signal by a predetermined amount. As a frequency shifter, for example, a device that performs frequency shift of an optical signal based on an acousto-optic effect or an electro-optic effect is known. The optical signal 1 of Sub-band 1 is inputted to the frequency shifter 10. Sub-band 1 includes a plurality of carriers having different wavelengths. FIG. 3 schematically illustrates an example in which three carriers of frequencies f1, f2, and f3 are included in the optical signal 1. The frequencies f1, f2, and f3 are the frequencies defined by frequency grids used in the submarine communication system 100. The branch station 53 can therefore also transmit and receive only optical signals of frequency grids including the frequencies f1, f2, and f3. In FIG. 3, f1<f2<f3 is satisfied, and the interval between f1 and f2 and the interval between f2 and f3 are both 2Δf.

The frequency shifter 10 shifts the frequency to the higher side (shorter wavelength side) by Δf for each of the three carriers included in the optical signal 1. In other words, the frequencies of the four carriers of the frequencies f1, f2, and f3 of the optical signal 1 are f1+Δf, f2+Δf, and f3+Δf, respectively. When passing through the frequency shifter 10, the optical signal 1 of Sub-band 1 becomes the optical signal 4 of Sub-band 1'. The frequency interval of each carrier included in Sub-bands 1 and 1' is 2Δf. In other words, the frequency of each carrier is shifted to the high frequency side by a frequency half the carrier interval. The center frequency of the carrier whose frequency is shifted does not coincide with the frequency of the carrier defined by the frequency grid of the branch station 53 but is in the middle of the defined frequency. The branch station 53 therefore cannot receive and demodulate a carrier included in the optical signal 4. In this way, the frequency shifter 10 invalidates the optical signal 1 by shifting the frequency of the optical signal 1 to a frequency that cannot be received by the branch station 53, and outputs the signal as the optical signal 4. Since the optical signal 2 of Sub-band 2 does not pass through the frequency shifter 10, the optical signal 2 is not invalidated. The branch station 53 therefore can normally demodulate the optical signal 2.

In this way, since the branch station 53 cannot receive the optical signal 4, the submarine communication system 100 according to the present example embodiment makes it difficult to intercept the optical signal 1 that is not needed in the branch station 53 among the optical signals branched from the trunk station 51 to the branch station 53.

The frequency shifter 10 performs only a process of shifting the frequency of the input optical signal 1 and does not attenuate the power of the optical signal 1. Therefore, as compared with a configuration in which the optical filter 1 prevents the entire optical signal 1 of Sub-band 1, the power of the optical signal transmitted from the node 110 to the branch station 53 due to the blocking of the optical signal 1 is not lowered. For this reason, the input/output power of the optical submarine repeater 54 installed in a transmission path from the node 110 to the branch station 53 is not lowered. The submarine communication system 100 according to the present embodiment can therefore secure the security of unneeded optical signals in the branch station while operating an optical submarine repeater on the branch side at rated operation.

The direction of frequency shift in the frequency shifter 10 may be on the higher side or the lower side of the carrier frequency. The amount of frequency shift may be not half the frequency interval of the frequency grid. The amount of frequency shift is an amount that makes it impossible for the optical signal 4 to be received by the branch station 53. The amount of frequency shift is set in such a way that the wavelength range of Sub-band 1' does not overlap that of Sub-band 2.

As described above, the submarine communication system 100 according to the first example embodiment can transmit only a target optical signal to a branch station while securing the security of the optical signal not needed in the branch station. The reason is that, by shifting the frequency of an optical signal not needed in the branch station, it becomes difficult to intercept at the branch station. Since the total power of the optical signal 1 and the optical signal 4 going from the node 110 to the branch station 53 is not lowered by frequency shift, it is possible to operate an optical submarine repeater toward the branch station within a rated range.

In other words, the submarine communication system 100 according to the first example embodiment can prevent signals that are not needed at the branch station from being intercepted at the branch station without lowering the power of the optical signal transmitted by the node to the branch station.

Further, by using the WSS module, the submarine communication system 100 of the first embodiment can configure a node with a small number of parts. The setting of the filtering wavelength of the WSS module can be changed even after the node is in operation. The submarine communication system 100 of the first embodiment can thus build a compact node and a submarine communication system that is easy to maintain.

Second Example Embodiment

Figure 4:
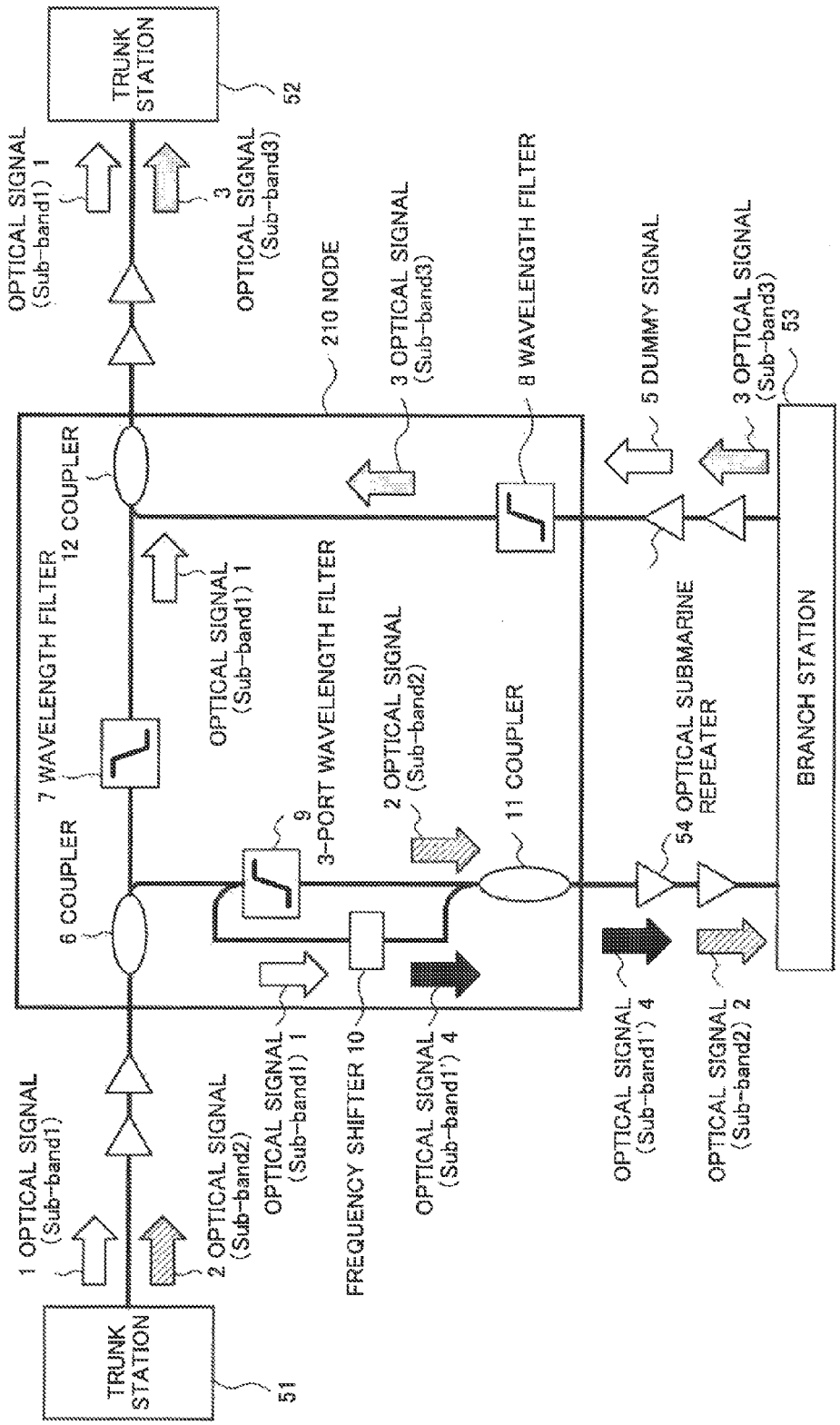
FIG. 4 is a block diagram illustrating a configuration of a submarine communication system according to a second example embodiment of the present invention.

FIG. 4 is a block diagram illustrating a configuration of a submarine communication system 200 according to the second example embodiment of the present invention. In the following drawings, the same reference numerals are given to the same elements as those described in the drawings, and redundant explanation will be omitted. The submarine communication system 200 includes trunk stations 51 and 52, a branch station 53 and a node 210. The trunk stations 51, 52 and the branch station 53, and the node 210 are connected by a submarine optical cable. The node 210 differs from the node 110 described in FIG. 1 in that it does not include WSS modules 16 and 17, and that wavelength filters 7 and 8, a 3-port wavelength filter 9 and a coupler 12 are provided.

The wavelength filter 7 transmits an optical signal of the wavelength band of Sub-band 1 and blocks an optical signal of the wavelength band of Sub-band 2. The wavelength filter 8 transmits the optical signals of the wavelength bands of Sub-bands 2 and 3, and blocks an optical signal of the wavelength band of Sub-band 1 and the dummy signal 5. The 3-port wavelength filter 9 separates the wavelength-multiplexed optical signals of Sub-band 1 and Sub-band 2 into the optical signal 1 of Sub-band 1 and the optical signal 2 of Sub-band 2.

The 3-port wavelength filter 9 separates the optical signals 1 and 2 branched by the coupler 6 and headed toward the branch station 53 into the optical signal 1 of Sub-band 1 and the optical signal 2 of Sub-band 2. The 3-port wavelength filter 9 separates the optical signal 1 of Sub-band 1 and the optical signal 2 of Sub-band 2, for example, by using a dielectric multilayer film filter whose reflectance and transmittance change according to the wavelength. The optical signal 1 is invalidated by the frequency shifter 10 in the same frequency shift as in the first embodiment. In other words, the frequency of a carrier included in the optical signal 1 undergoes frequency shift by the frequency shifter 10 as in FIG. 3 and is outputted from the frequency shifter 10 as the optical signal 4. The coupler 11 couples the optical signal 4 of Sub-band 1' and the optical signal 2 of Sub-band 2 and transmits the coupled optical signal to the branch station 53. The optical signals 2 and 4 outputted from the coupler 11 travel through a submarine cable including the optical submarine repeater 54 and reach a branch station 53. As in the first example embodiment, a coupler capable of wavelength multiplexing the optical signal 4 of Sub-band 1' and the optical signal 2 of Sub-band 2 or a directional coupler is used as the coupler 11.

On the other hand, in the optical signals 1 and 2 which are branched by the coupler 6 and are transmitted to the trunk station 52, the optical signal 2 of Sub-band 2 is removed by the wavelength filter 7, and only the optical signal 1 of Sub-band 1 is inputted to the coupler 12.

The branch station 53 transmits the optical signal 3 and the dummy signal 5 addressed to the trunk station 52 to the node 210. The dummy signal 5 having a wavelength band of Sub-band 1 received from the branch station 53 is blocked by the wavelength filter 8 and only the optical signal 3 of Sub-band 3 is inputted to the coupler 12. The coupler 12 multiplexes the optical signal 1 and the optical signal 3 and outputs them to the trunk station 52. As the coupler 12, a directional coupler is used. Alternatively, a coupler capable of wavelength-multiplexing the optical signal 1 of Sub-band 1 and the optical signal 3 of Sub-band 3 is used as the coupler 12.

As described above, the submarine communication system 200 of the second example embodiment invalidates an optical signal by shifting the frequency of the optical signal not needed in the branch station like the submarine communication system 100 of the first example embodiment. As a result, the submarine communication system 200 according to the second example embodiment can prevent a signal that is not needed at the branch station from being intercepted at the branch station without lowering the power of an optical signal that the node transmits to the branch station.

Further, compared with the first embodiment, the submarine communication system 200 of the second example embodiment increases the number of parts constituting the node 210, but does not need a relatively expensive WSS module. Therefore, the submarine communication system 200 of the second example embodiment has an advantage that the cost of the node 210 is lowered as compared with the submarine communication system 100 of the first example embodiment.

Third Example Embodiment

Figure 5:
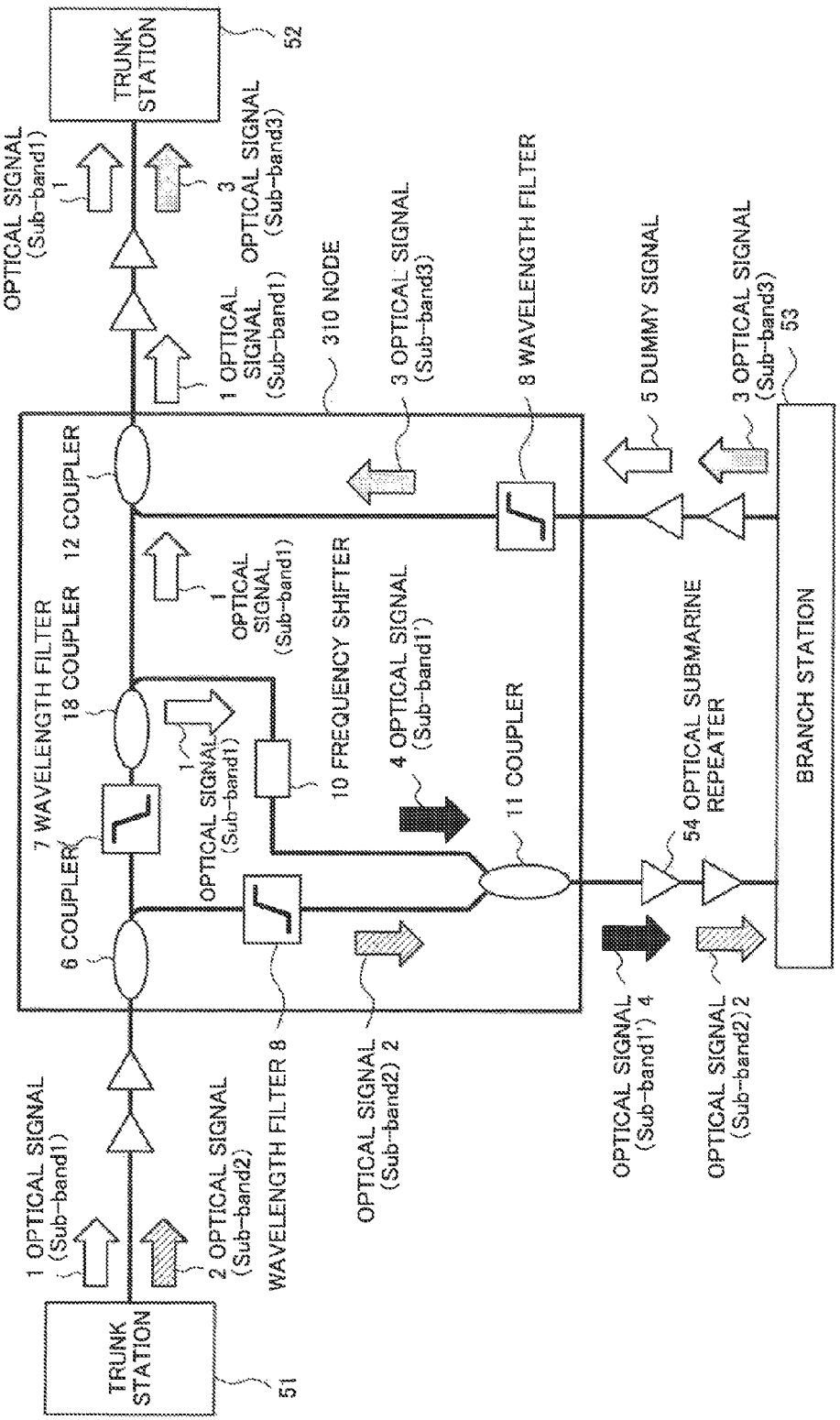
FIG. 5 is a block diagram illustrating a configuration of a submarine communication system according to a third example embodiment of the present invention.
Figure 6:
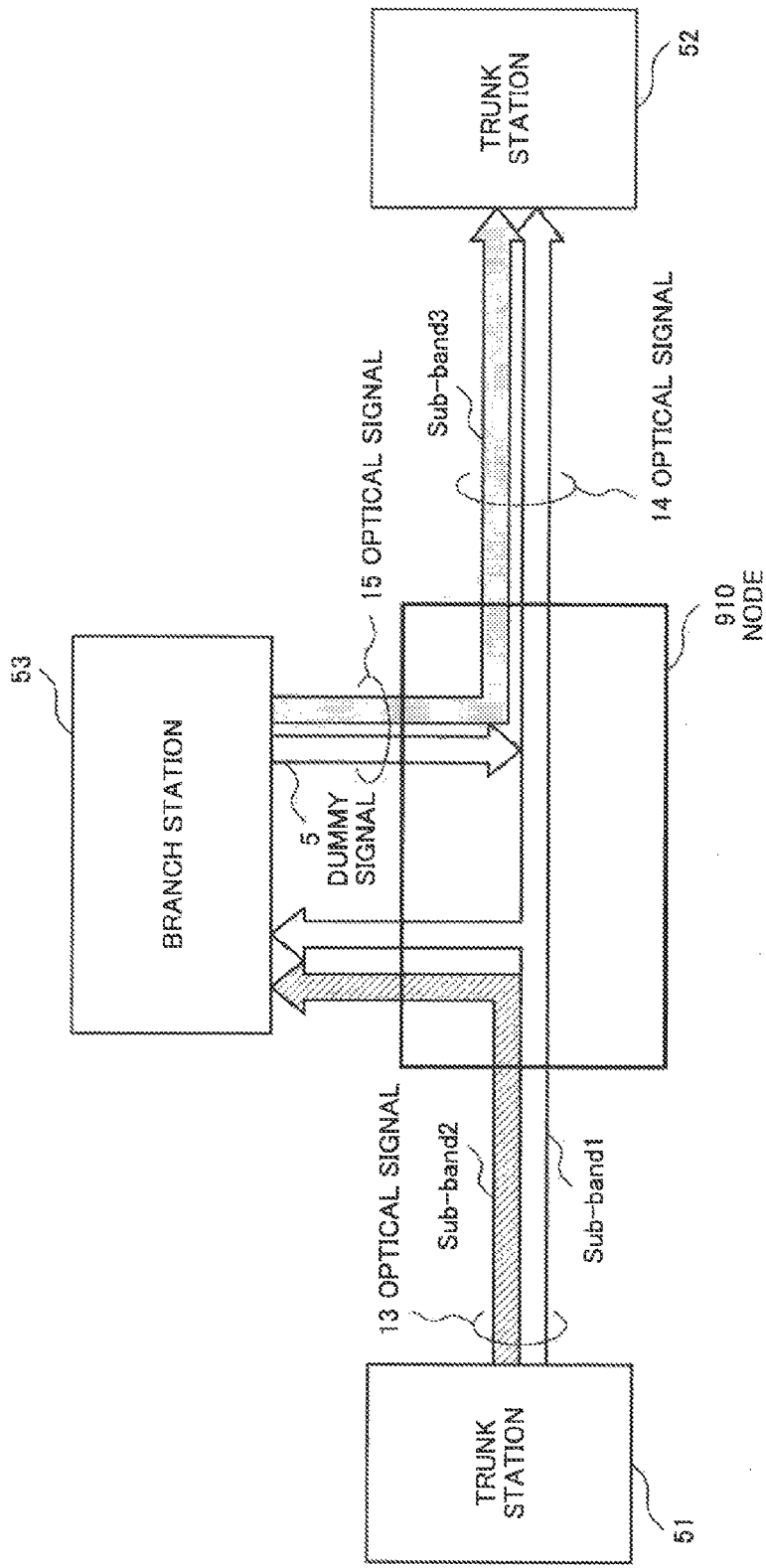
FIG. 6 is a block diagram illustrating a general configuration of a submarine communication system into which an OADM/ROADM system is introduced.
Figure 7:
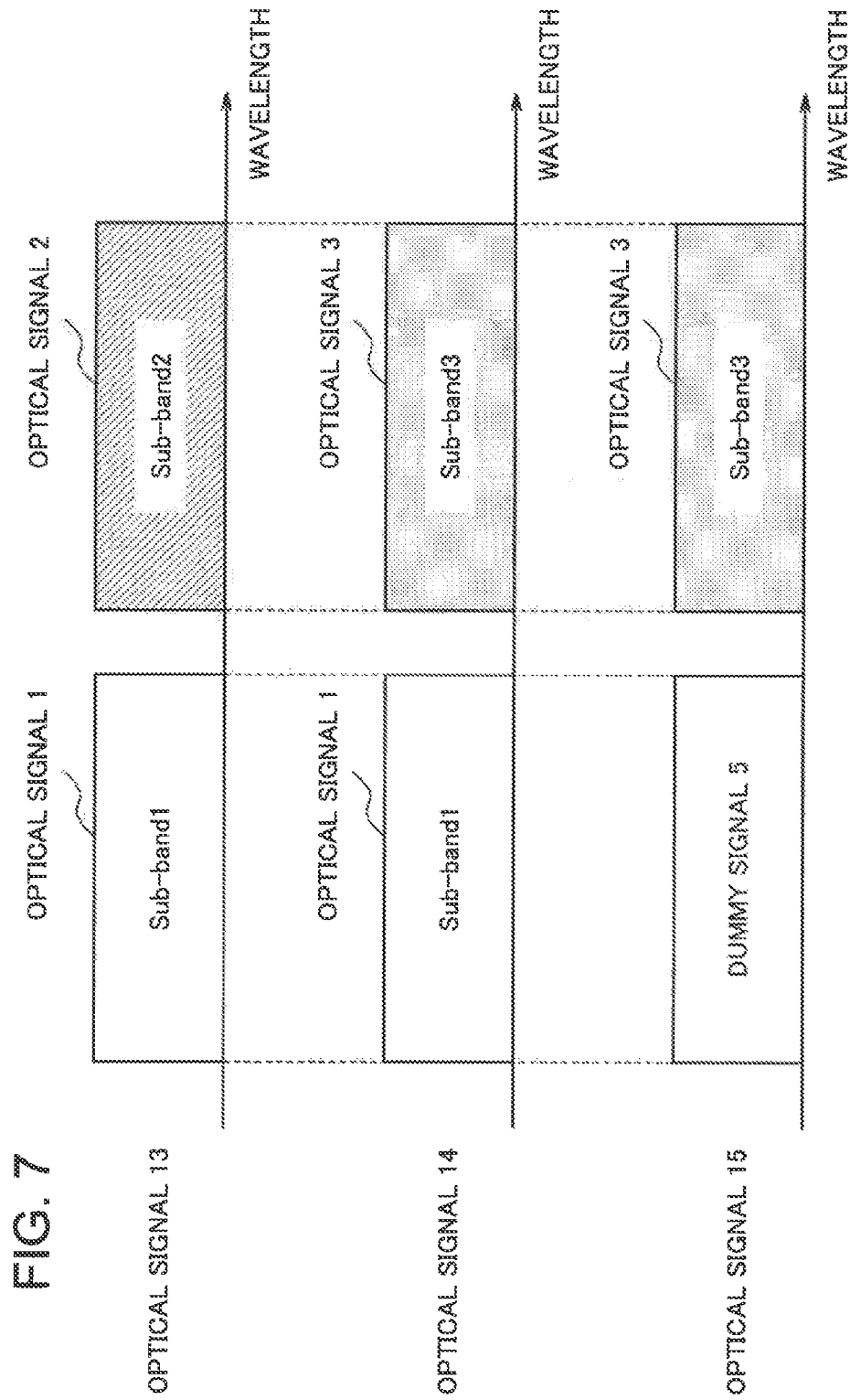
FIG. 7 is a diagram illustrating a wavelength band of an optical signal transmitted and received at a node.
Figure 8:
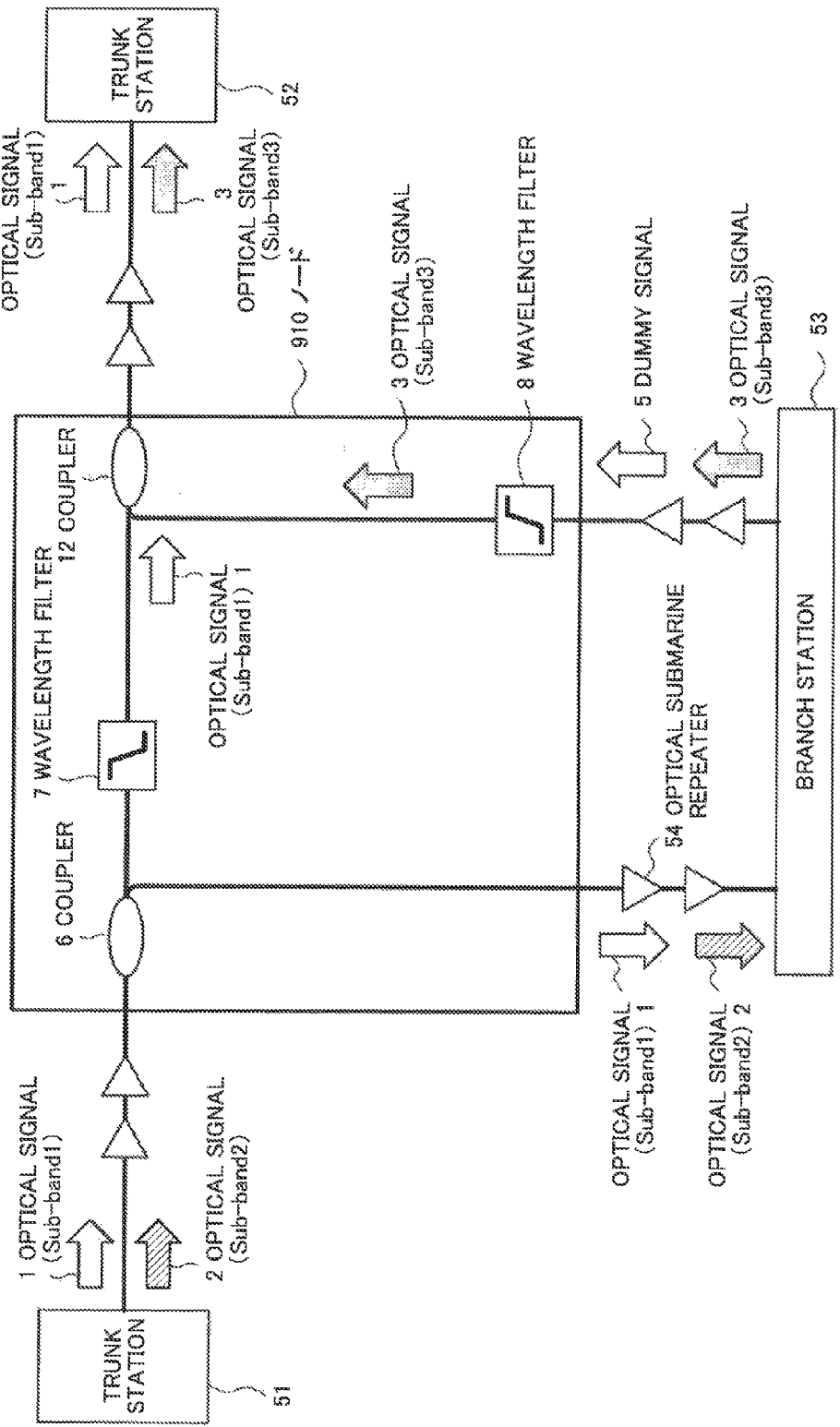
FIG. 8 is a diagram illustrating a detailed configuration of a general submarine communication system.

FIG. 5 is a block diagram illustrating a configuration of a submarine communication system 300 according to a third example embodiment of the present invention. The submarine communication system 300 includes trunk stations 51 and 52, a branch station 53, and a node 310. The trunk stations 51 and 52 and the branch station 53 and the node 310 are connected by a submarine optical cable. The node 310 differs from the node 210 described in FIG. 4 in that it does not include a 3-port wavelength filter 9, and that a coupler 18 and two wavelength filters 8 are provided.

At node 310, in the optical signals 1 and 2 branched by the coupler 6 and directed toward the branch station 53, only the optical signal 2 of Sub-band 2 is transmitted and the optical signal 1 of Sub-band 1 is blocked by the wavelength filter 8.

On the other hand, in the other optical signal branched by the coupler 6, the optical signal 2 is blocked by the wavelength filter 7, and only the optical signal 1 is inputted to the coupler 18. The coupler 18 branches the optical signal 1 inputted from the wavelength filter 7 into two. One of the optical signals 1 branched by the coupler 18 is frequency-shifted by the frequency shifter 10 in the same way as in the first and second example embodiments and is outputted as the optical signal 4. The other one of the optical signals 1 branched by the coupler 18 is inputted to the coupler 12.

The coupler 11 combines the optical signal 2 that has passed through the coupler 6 and the wavelength filter 8 with the optical signal 4 that is outputted from the frequency shifter 10, and transmits it to the branch station 53. The optical signal 2 and the optical signal 4 transmitted from the coupler 11 are transmitted through a submarine cable including the optical submarine repeater 54 and reach the branch station 53.

The branch station 53 receives the optical signal 2 and the optical signal 4 transmitted from the node 310. The branch station 53 transmits the dummy signal 5 and the optical signal 3 addressed to the trunk station 52 to the node 310. The dummy signal 5 is removed by the wavelength filter 8 connected to the coupler 12, and only the optical signal 3 is inputted to the coupler 12. The coupler 12 combines the optical signal 1 outputted from the coupler 18 and the optical signal 3 outputted from the wavelength filter 8, and transmits the coupled optical signal to the trunk station 52. As in the first and second example embodiments, as the coupler 11, a directional coupler or a multiplexer can be used. In addition, similarly to the second example embodiment, a directional coupler or a multiplexer can also be used for the coupler 12.

The submarine communication system 300 of the third example embodiment is also invalidated by shifting the frequency of an optical signal not needed in the branch station like the submarine communication systems 100 and 200 of the first and second example embodiments. Therefore, the submarine communication system 300 of the third example embodiment can prevent a signal which is not needed at the branch station from being intercepted at the branch station without lowering the power of an optical signal transmitted from the node to the branch station.

Further, since the submarine communication system 300 of the third example embodiment does not use the WSS module like the submarine communication system 200 of the second example embodiment, the effect of reducing the cost of the node 310 is exerted.

Minimum Configuration of Example Embodiment

The effect of the submarine communication system 100 of the first example embodiment is also brought by the following node device comprising a part of the configuration of the node 110 of FIG. 1. In other words, the node device includes a first optical unit and a second optical unit. The first optical unit (the coupler 6 in FIG. 1) outputs the first optical signal (optical signal 1) and the second optical signal (optical signal 2). The first optical signal is a signal addressed to the second terminal station (trunk station 52) received from the first terminal station (trunk station 51). The second optical signal is a signal whose wavelength band is different from that of the first optical signal, which is destined to the third terminal station (branch station 53) received from the first terminal station. To a second optical unit (WSS module 16, frequency shifter 10, and coupler 11), first and second optical signals outputted from the first optical unit are inputted and the frequency of the first optical signal is shifted by a predetermined value to obtain a fourth optical signal (optical signal 4). The second optical unit passes the second optical signal as it is, combines the second and fourth optical signals, and transmits the coupled optical signal to the third terminal station.

The node apparatus having such a configuration makes it difficult to intercept the first optical signal at the third terminal station by shifting the frequency of the first optical signal by a predetermined value. Therefore, similarly to the node device of the first example embodiment, the above-described node device can prevent a signal which is not needed in a branch station from being intercepted by the branch station without greatly lowering the power of an optical signal transmitted from the node device to the branch station.

Further, the above-described first optical unit includes the coupler 6 of the node 210 described in FIG. 4, and further, the above-described second optical unit may include the 3-port wavelength filter 9, the frequency shifter 10, and the coupler 11 of the node 210 described in FIG. 4.

Alternatively, the above-described first optical unit includes the coupler 6, the wavelength filter 7, and the coupler 18 of the node 310 described in FIG. 5, and further, the second optical unit may include the wavelength filter 8, the frequency shifter 10, and the coupler 11 connected between the coupler 6 and the coupler 11 of the node 310 described in FIG. 5.

Although the present invention has been described with reference to the example embodiments, the present invention is not limited to the above-described example embodiments. Various changes that can be understood by those skilled in the art within the scope of the present invention can be made to the configuration and details of the present invention.

For example, in each embodiment, the submarine communication system has been described as an example, but the configuration of each example embodiment can also be applied to a land-based communication system.

In each drawing, the arrow indicating the direction of a signal indicates the direction of the signal in the description, and the direction of the signal is not limited.

This application claims the priority based on Japanese Patent Application No. 2014-202891 filed on Oct. 1, 2014, and incorporates all of the disclosure thereof.

REFERENCE SIGNS LIST

100, 200, 300, 900 submarine communication system
110, 210, 310, 910 node
1, 2, 3, 4, 13, 14, 15 optical signal
5 dummy signal
6, 11, 12, 18 coupler
7, 8 wavelength filter
9 3-port wavelength filter
10 frequency shifter
16, 17 WSS module
51, 52 trunk station
53 branch station
54 optical submarine repeater

The invention claimed is:

1. A node device comprising:
   a first optical circuit that outputs a first optical signal addressed to a second terminal station that is received from a first terminal station and a second optical signal having a wavelength band different from that of the first optical signal addressed to a third terminal station that is received from the first terminal station; and
   a second optical circuit in which the first and second optical signals outputted from the first optical circuit are inputted, the frequency of the first optical signal is shifted by a predetermined amount into a fourth optical signal, the second optical signal is passed as it is, and the second and fourth optical signals are coupled and transmitted to the third terminal station.

2. The node device according to claim 1, wherein
   the predetermined amount is determined in such a way that the fourth optical signal cannot be received at the third terminal station.

3. The node device according to claim 2, wherein
   the predetermined amount is determined in such a way that the frequency of the carrier of the fourth optical signal is a frequency at the middle of the frequency grid receivable by the third terminal station.

4. The node device according to claim 2, wherein the second optical circuit comprises: a WSS (wavelength selective switch) module that outputs the first optical signal and the second optical signal outputted from the first optical circuit from different ports; a frequency shifter that shifts the frequency of the first optical signal outputted from the WSS module by the predetermined value to generate the fourth optical signal; and a second coupler combining the second and fourth optical signals and transmitting the coupled optical signal to the third terminal station.

5. The node device according to claim 2, wherein the second optical circuit comprises: a 3-port wavelength filter for separating the first and second optical signals outputted from the first optical circuit into the first optical signal and the second optical signal; a frequency shifter for shifting the frequency of the first optical signal demultiplexed by the 3-port wavelength filter by a predetermined value and outputting the signal as the fourth optical signal; and a second coupler for coupling the second optical signal and the fourth optical signal separated by the 3-port wavelength filter and transmitting the coupled optical signal to the third terminal station.

6. The node device according to claim 2, wherein
   the first optical circuit comprises: a first coupler for branching and outputting the first and second optical signals received from the first terminal station; a first wavelength filter for removing the second optical signal from one of the optical signals branched into two by the first coupler and outputting the first optical signal; and a third coupler for branching and outputting the first optical signal outputted from the first wavelength filter in two, and
   the second optical circuit comprises: a second wavelength filter for removing the first optical signal from the other of the optical signals branched into two by the first coupler and outputting the second optical signal; a frequency shifter for shifting the frequency of one optical signal outputted from the third coupler by a predetermined value and outputting the optical signal as the fourth optical signal; and a fourth coupler for coupling the fourth optical signal and the second optical signal outputted from the second wavelength filter and transmitting the coupled signal to the third terminal station.

7. The node device according to claim 2, further comprising a third optical circuit for coupling a third optical signal addressed to the second terminal station received from the third terminal station and the first optical signal outputted from the first optical circuit and transmitting the coupled signal to the second terminal station.

8. The node device according to claim 1, wherein
the predetermined amount is determined in such a way that the frequency of the carrier of the fourth optical signal is a frequency at the middle of the frequency grid receivable by the third terminal station.

9. The node device according to claim 8, wherein the second optical circuit comprises: a WSS (wavelength selective switch) module that outputs the first optical signal and the second optical signal outputted from the first optical circuit from different ports; a frequency shifter that shifts the frequency of the first optical signal outputted from the WSS module by the predetermined value to generate the fourth optical signal; and a second coupler combining the second and fourth optical signals and transmitting the coupled optical signal to the third terminal station.

10. The node device according to claim 8, wherein the second optical circuit comprises: a 3-port wavelength filter for separating the first and second optical signals outputted from the first optical circuit into the first optical signal and the second optical signal; a frequency shifter for shifting the frequency of the first optical signal demultiplexed by the 3-port wavelength filter by a predetermined value and outputting the signal as the fourth optical signal; and a second coupler for coupling the second optical signal and the fourth optical signal separated by the 3-port wavelength filter and transmitting the coupled optical signal to the third terminal station.

11. The node device according to claim 8, wherein
the first optical circuit comprises: a first coupler for branching and outputting the first and second optical signals received from the first terminal station; a first wavelength filter for removing the second optical signal from one of the optical signals branched into two by the first coupler and outputting the first optical signal; and a third coupler for branching and outputting the first optical signal outputted from the first wavelength filter in two, and
the second optical circuit comprises: a second wavelength filter for removing the first optical signal from the other of the optical signals branched into two by the first coupler and outputting the second optical signal; a frequency shifter for shifting the frequency of one optical signal outputted from the third coupler by a predetermined value and outputting the optical signal as the fourth optical signal; and a fourth coupler for coupling the fourth optical signal and the second optical signal outputted from the second wavelength filter and transmitting the coupled signal to the third terminal station.

12. The node device according to claim 8, further comprising a third optical circuit for coupling a third optical signal addressed to the second terminal station received from the third terminal station and the first optical signal outputted from the first optical circuit and transmitting the coupled signal to the second terminal station.

13. The node device according to claim 1, wherein the second optical circuit comprises: a WSS (wavelength selective switch) module that outputs the first optical signal and the second optical signal outputted from the first optical circuit from different ports; a frequency shifter that shifts the frequency of the first optical signal outputted from the WSS module by the predetermined value to generate the fourth optical signal; and a second coupler combining the second and fourth optical signals and transmitting the coupled optical signal to the third terminal station.

14. The node device according to claim 1, wherein the second optical circuit comprises: a 3-port wavelength filter for separating the first and second optical signals outputted from the first optical circuit into the first optical signal and the second optical signal; a frequency shifter for shifting the frequency of the first optical signal demultiplexed by the 3-port wavelength filter by a predetermined value and outputting the signal as the fourth optical signal; and a second coupler for coupling the second optical signal and the fourth optical signal separated by the 3-port wavelength filter and transmitting the coupled optical signal to the third terminal station.

15. The node device according to claim 1, wherein
the first optical circuit comprises: a first coupler for branching and outputting the first and second optical signals received from the first terminal station; a first wavelength filter for removing the second optical signal from one of the optical signals branched into two by the first coupler and outputting the first optical signal; and a third coupler for branching and outputting the first optical signal outputted from the first wavelength filter in two, and
the second optical circuit comprises: a second wavelength filter for removing the first optical signal from the other of the optical signals branched into two by the first coupler and outputting the second optical signal; a frequency shifter for shifting the frequency of one optical signal outputted from the third coupler by a predetermined value and outputting the optical signal as the fourth optical signal; and a fourth coupler for coupling the fourth optical signal and the second optical signal outputted from the second wavelength filter and transmitting the coupled signal to the third terminal station.

16. The node device according to claim 1, further comprising a third optical circuit for coupling a third optical signal addressed to the second terminal station received from the third terminal station and the first optical signal outputted from the first optical circuit and transmitting the coupled signal to the second terminal station.

17. The node device according to claim 16, wherein the third optical circuit comprises a WSS module.

18. A communication system in which first to third terminal stations are connected to the node device according to claim 1 via a transmission path.

19. A method for controlling a node device comprising:
outputting a first optical signal addressed to a second terminal station that is received from a first terminal station and a second optical signal having a wavelength band different from that of the first optical signal addressed to a third terminal station that is received from the first terminal station are outputted;
shifting the frequency of the first optical signal by a predetermined amount into a fourth optical signal; and
coupling the second and fourth optical signals and transmitting the second and fourth optical signals coupled to the third terminal station.

* * * * *